(12) United States Patent
Gasser et al.

(10) Patent No.: US 6,332,704 B1
(45) Date of Patent: Dec. 25, 2001

(54) SHAKER FOR FOAMING DAIRY PRODUCTS

(75) Inventors: Ruedi Gasser, Buerglen; Nico Cocchiarella, Kehrsiten, both of (CH)

(73) Assignee: Maxs AG, Sachseln (CH)

( * ) Notice: Subject to any disclaimer, the term of this patent is extended or adjusted under 35 U.S.C. 154(b) by 0 days.

(21) Appl. No.: 09/463,018

(22) PCT Filed: Apr. 2, 1998

(86) PCT No.: PCT/EP98/01954

§ 371 Date: Apr. 12, 2000

§ 102(e) Date: Apr. 12, 2000

(87) PCT Pub. No.: WO99/40831

PCT Pub. Date: Aug. 19, 1999

(30) Foreign Application Priority Data

Feb. 13, 1998 (DE) .............................................. 198 06 020

(51) Int. Cl.[7] .................................................. A47J 43/27
(52) U.S. Cl. ........................................... 366/130; 220/568
(58) Field of Search .................................... 366/130, 219, 366/241–242, 253, 347; 239/374; 220/568; 215/11.1, DIG. 8

(56) References Cited

U.S. PATENT DOCUMENTS

| | | | |
|---|---|---|---|
| 53,965 | * | 4/1866 | Fisler . |
| 1,075,119 | * | 10/1913 | Reichner . |
| 1,201,284 | * | 10/1916 | Gilchrist . |
| 1,661,336 | * | 3/1928 | Katz . |
| 1,748,483 | * | 2/1930 | Hyde . |
| 1,878,924 | * | 9/1932 | Will . |
| 2,019,535 | * | 11/1935 | Herr . |
| 2,500,611 | * | 3/1950 | Kereluck . |
| 2,592,485 | * | 4/1952 | Stair . |
| 3,820,692 | * | 6/1974 | Swett et al. . |
| 4,003,555 | * | 1/1977 | Swartz . |
| 4,818,114 | | 4/1989 | Ghavi . |
| 5,547,275 | * | 8/1996 | Lillelund et al. ............... 215/DIG. 8 |
| 5,788,369 | * | 8/1998 | Tseng ................................... 366/130 |

FOREIGN PATENT DOCUMENTS

| | | |
|---|---|---|
| 29 08 526 | 4/1980 | (DE) . |
| 296 18 322 | 2/1997 | (DE) . |

* cited by examiner

Primary Examiner—Charles E. Cooley
(74) Attorney, Agent, or Firm—Finnegan, Henderson, Farabow, Garrett & Dunner, L.L.P.

(57) ABSTRACT

Shaker for liquids, especially dairy products such as half-and-half cream and milk. In known shakers cocktails are mixed by pouring different liquids into a bowl which has then inserted thereinto a bowl-shaped sifter filled with solids such as ice, lemon slices or cocoa. Although the ingredients of the cocktail are finely mixed with one another without lumping by shaking said shaker along its longitudinal axis, it is not possible to foam the liquids. The novel shaker makes it possible to foam liquid foodstuffs, especially milk, by simply shaking the same. The shaker is designed for foaming purposes in that a separation sifter is arranged in a direction substantially transverse to the vertical axis of the shaker so that the total volume of the closed bowl is subdivided by the separation sifter in a ratio of 2:1. The shaker is particularly suited for preparing cappuccino cream.

29 Claims, 3 Drawing Sheets

SHAKER FOR FOAMING DAIRY PRODUCTS

BACKGROUND OF THE INVENTION

The present invention relates to a shaker for liquids, with the shaker comprising a bowl-shaped bottom part and a lid which can be mounted to be sealed and removed again, with a permeable separation sifter being arranged in the closed bowl and the shaker being configured to foam liquid foodstuffs, in particular dairy products such as half-and-half cream and milk, in that the separation sifter is arranged substantially in a direction transverse to the vertical axis of the shaker and the total volume of the closed bowl is subdivided by the separation sifter in a ratio of about 2:1.

Such shakers are known to be used for mixing beverages, such as cocktails. Different liquids as well as solids, such as ice, are filled into the shaker and the shaker is then moved back and forth by vigorous, shock like movements in the axial direction. The different beverages are thereby intermixed in a uniform manner.

A bowl-like sifter which is disposed in said known shakers serves to finely distribute solid ingredients of the cocktails, such as cocoa or molasses, which otherwise tend to get lumpy during wetting. To this end all of the solid ingredients, i.e. also ice, are filled into the shaker and are then mixed with the beverages by way of shaking.

Furthermore, such a shaker is e.g. known from German patent specification 819 365. A shaker is there shown with a lid to be used as a fruit press and with a bowl. A disc-like separation sifter is arranged approximately at a third of the bowl height. Such a shaker serves to thoroughly mix liquids with dust-like foodstuffs in a direction transverse to the vertical axis of the shaker, so that sauces, doughs and beverages can be prepared.

When the shaker shown in German patent specification 819 365 is used in practice, it becomes apparent that liquids, in particular milk, cannot be foamed with said shaker.

A further generic shaker is shown in DE 29 08 526 BI. In the case of said shaker a sifter which is also disc-shaped is put on a bowl-like bottom part of the shaker. A lid is screwed onto the bowl-like bottom part, the volume of the lid being approximately half the volume of the bowl. In the mounted state of the lid the sifter is held between lid and bottom part.

In the case of the shaker of DE 29 08 526 61 it has also been found that dairy products cannot be foamed with the sifter shown therein. DE 29 08 526 BI, too, only reveals that said shaker serves to intermix liquids or to mix solids with liquids.

The known shakers have the drawback that even in the case of very strong shaking movements they are not able to foam beverages, such as milk.

SUMMARY OF THE INVENTION

It is therefore the object of the present invention to provide a shaker of a simple construction which makes it possible to foam liquid foodstuffs, such as milk, by way of shaking movements performed in the longitudinal direction of the shaker.

According to the invention this object is achieved for a shaker of the above-mentioned type in that the separation sifter is configured to be substantially conical and that in the closed state of the shaker the outer rim of the separation sifter is arranged closer towards the bowl bottom than the central area of the separation sifter.

Such a solution is simple and has the advantage that, thanks to the arrangement the separation sifter and the subdivision of the volume, foamed milk can be prepared by way of shaking movements performed along the axis of the shaker. After and during shaking the foamed milk flows off more easily by gravity because of the conical shape of the separation sifter.

Although there are milk foamers in which a fine sifter held in the lid is moved back and forth in the bowl along the vertical axis on a rod and the milk is thereby foamed, such devices are not easy to handle. The long rod tends to get jammed during the reciprocating movement and is subjected to strong mechanical loads. The constructional efforts for a movable rod are high. It is of importance to a fast foam preparation that the sifter is moved as often and rapidly as possible through the parting plane milk/air. Such a feature, however, can only be achieved in a cumbersome way with such types of foamers.

To simplify the filling and removing processes for the milk foam, the total volume of the shaker can be subdivided by the separation sifter in the closed state of the shaker in such a manner that the volume part at the bowl side is about twice the volume part at the lid side because after the shaker has been put down the milk foam or the milk will collect automatically by gravity in the larger volume part at the bowl side.

It is also advantageous when the separation sifter is designed for automatically dripping the liquid into the bowl in that in the closed state of the shaker an outer rim of the separation sifter is arranged closer to the bowl bottom than a central portion of the separation sifter. As a result, liquids will automatically flow by gravity from the central portion of the separation sifter towards the outer rim, thereby dripping off into the bowl volume which serves as the collection volume. Foam remaining in the volume at the lid or in the separation sifter need thus not be scratched out after the foaming process.

To firmly hold the separation sifter in the bowl and to protect it from slipping in the direction of the vertical axis of the shaker, the outer rim of the separation sifter may be supported in the closed state of the lid at least sectionwise on the inner wall of the bowl in a further advantageous development.

The shaker can be made usable for a great variety of liquids by detachably holding the separation sifter on the lid. As a result, further separation sifters which are suited for liquids other than milk can be mounted on the lid. Furthermore, the lid can more easily be cleaned by removing the separation sifter.

In a further development a section of the separation sifter at the lid side may here be designed as a fastening section which cooperates with a corresponding receiving section of the lid in such a manner that the separation sifter is exchangeably held in the lid. It is here advantageous when the fastening section and the receiving section are arranged along the vertical axis of the shaker and when the fastening section is designed as an outer cone and the receiving section as an inner cone. Such a configuration of the fastening section and the receiving section can be easily manufactured and is thus inexpensive. The design as an outer cone and as an inner cone specifically provides for surfaces which can easily be cleaned after disassembly.

To make the foaming of hot beverages possible, the fastening section may be provided with a vent groove arranged in the direction of the vertical axis, and/or the lid groove may be provided with a vent hole, preferably arranged in the area of the vertical axis, through which the bowl volume is connected to the surroundings in the closed of the bowl. The volume can thereby be compensated during cooling of the beverages.

In a further advantageous development the separation sifter may be frictionally connected to the lid. A frictional connection can be easily disengaged and produced with little efforts.

A particularly reliable and firm connection of the separation sifter to the lid ran be achieved through a positive connection between separation sifter and lid.

To obtain a particularly simple and durable sealing connection of the lid to the bowl, the shape of the outer wall of the lid may substantially correspond in a further advantageous development to the shape of an inner wall of the bowl in an area in which the lid is supported on the bowl in the closed state of the bowl. As a result, the outer wall of the lid and the inner wall of the bowl are exactly seated on one another in planar fashion.

In a further advantageous development the lid may have a double outer wall with a recess that is open in the direction of the bowl bottom. Such a configuration has the advantage that material can be saved during manufacture of the lid without any loss in strength or tightness of the connection between bowl and lid.

In a further advantageous development the recess may be designed such that an edge of the bowl which faces the lid can be received at least sectionwise in the recess. A tight seal between bowl and lid which in addition can be subjected to mechanical loads can thereby be produced easily. Such a closure can open less easily during shaking.

In a further advantageous development the outer rim of the separation sifter faces the bowl may be spaced apart substantially in the direction of the vertical axis of the shaker from a lower edge of the lid facing an inner wall of the bowl, preferably at a distance of 5 to 10 mm. Thanks to such a distance, remaining foam which is possibly contained in the lid volume and which especially in the case of viscous foams is not able to flow off independently from the lid volume can be poured off into the bowl after the lid has been removed. To this end the lid is held in a slightly inclined position so that the remaining foam on the upper side of the separation sifter can flow between separation sifter and lid into the bowl. A distance of e.g. 5 to 10 mm at the edge between lid and separation sifter has turned out to be advantageous.

It is also of advantage when in the closed state of the bowl the lid is frictionally connected to the bowl. In the case of conical bowls such a configuration can e.g. be achieved through a correspondingly conically shaped lid section. Such frictional conical connections can easily be established and cleaned.

To achieve a firm seat between lid and bowl in a further advantageous development, the lid may be positively connected to the bowl in the closed state of the bowl.

Milk can be whirled in a particularly efficient manner and thereby foamed rapidly in that an inner wall of the lid which is opposite to the bowl bottom is designed as an impingement wall for the milk by having a parabolic contour. As a consequence, the milk impinging on the impingement wall is deflected on account of the shaking movement to a considerable degree and sprayed and mixed with the air enclosed within the lid volume.

In a further advantageous development the separation sifter may be provided openings, preferably having an area between 0.15 mm$^2$ to 114 mm$^2$, preferably around 0.8 mm$^2$. The openings may have a square, circular or other shape. Openings of such a size effect a particularly rapid foaming action.

Circular openings with a diameter of 0.5 mm to 6 mm, preferably 1 mm, have turned out to be especially advantageous.

It is here also of advantage when the separation sifter comprises spokes, preferably between 6 to 12 spokes, and/or when the separation sifter is provided with a filter at least sectionwise and/or when the separation sifter is provided with circumferentially extending slit-like openings, preferably having a width of 0.5 mm to 4 mm in the radial direction. Such discs are suited for foaming liquids other than milk, e.g. half-and-half cream or egg white.

Furthermore, it is advantageous when the lid is made from metal. The bowl may also be made from metal. Likewise, the separation sifter may be made from metal. Metal has the advantage that the shakers made therefrom are very stable and scratch-resistant and can easily be cleaned.

In a further advantageous development the lid and/or the bowl and/or the separation sifter may be made from a plastic material. Shakers of plastics, preferably solvent-resistant plastics used in food technology, e.g. polypropylene, can be easily processed and are inexpensive.

The object according to the invention is also achieved with a shaker set consisting of an inventive shaker and at least one further separation sifter. Very different beverages can be foamed with such a shaker set.

The object of the invention is also achieved by a method for foaming milk milk is filled into a shaker and the shaker comprises a bowl-shaped bottom part and a lid which can be mounted to be sealed and removed again, with a permeable separation sifter being arranged in the closed vessel and the separation sifter being disposed substantially in a direction transverse to the vertical axis of the vessel in such a manner that the total volume of the closed vessel is subdivided by the separation sifter at a ratio of 2:1, and the bowl with lid and separation sifter is shaken back and forth in jolting fashion in the direction of the shaker axis for foaming the milk, with the latter being pressed time and again from the volume at the bowl side into the volume at the lid side and back through the separation sifter because of the constantly changing forces of acceleration, whereby the milk is whirled and foamed with the air enclosed in the shaker.

BRIEF DESCRIPTION OF THE DRAWINGS

The structure and function of two embodiments of a shaker according to the invention shall now be explained in an exemplary manner with reference to drawings, in which.

DETAILED DESCRIPTION OF THE PREFERRED EMBODIMENTS

Figure 1:
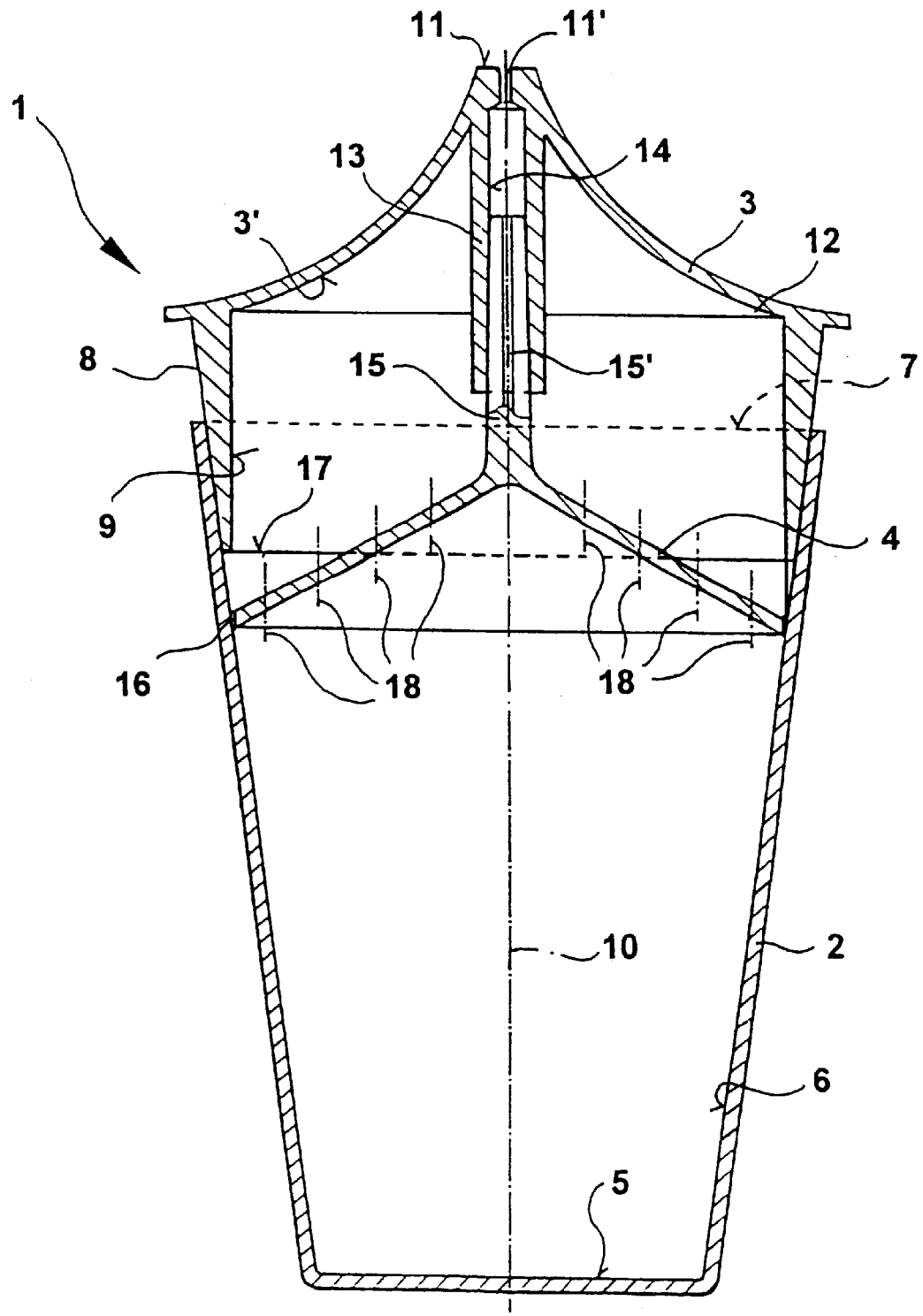
FIG. 1 is a longitudinal section showing a first embodiment of the shaker according to the invention.

The structure of a first embodiment of the shaker according to the invention will be described with reference to FIG. 1.

The shaker 1 comprises a bowl 2, a lid 3 and a separation sifter 4. All members 2, 3 and 4 are rotationally symmetrical.

The bowl 2 has a circular bottom surface 5 and an inner wall 6 which expands upwards from the bottom surface 5 in frustoconical fashion towards the bowl opening.

The bowl is made from polypropylene and weighs about 58 g. The inner diameter of the bowl 2 is 50 mm directly above the bottom surface 5 and 85 mm at the opening plane 7 of the bowl 2. The height of the bowl 2 is 125 mm, the wall thickness of the bowl 2 is 3 mm directly above the bottom surface 5 and 1 mm in the opening plane 7. The bottom thickness is 2 mm.

Lid 3 is placed on and seals the bowl 2. The liquid-tight closing of the bowl 2 by the lid 3 is accomplished through the frustoconical outer wall 8 of the lid 3, with the opening angle of the outer wall 8 corresponding to the opening angle of the inner wall 6 of the bowl 2, and the outer diameter of the outer wall 8 at half the height of the outer wall 8 corresponding to the inner diameter of the inner wall 6 in the opening plane 7. As a result, bowl 2 and lid 3 are in planar contact, thereby sealing the volume enclosed by them.

The lid is also made from polypropylene and weighs 38 g.

The height of the outer wall 8 in the direction of the vertical axis is 33 mm. The interior 9 of the outer wall 8 is made cylindrical and parallel to the vertical axis 10 of the bowl 2. The lid extends from said inner cylindrical section 9 inwards in parabolic fashion and away from the bowl bottom 5, thereby forming an impingement surface 3'. Thus a section 11 of the lid 3 in the area of the vertical axis 10 is further spaced apart the bowl bottom than a lid edge 12. Said section 11 has arranged thereon in the interior of the lid a sleeve-like receiving section 13 which extends along the vertical axis towards the bowl bottom 5 and is used for receiving the separation sifter 4.

The receiving section 13 has an inner cone 14 which expands towards the bowl bottom and has inserted thereinto a corresponding outer cone of the fastening section 15 of the separation sifter 4. The fastening section 15 is integrally connected to the separation sifter 4. The length of the outer cone is 35 mm at a maximum diameter of 6 mm and a minimum diameter of 5 mm. Thus the separation sifter 4 is held in the lid 3 such that its lower edge 16 is spaced apart from the lower edge 17 of the lid 3 in the direction of the bowl bottom 5. When measured in the direction of the vertical axis, the distance between the lower lid edge 17 and the outer edge 16 of the separation sifter is about 10 mm.

For venting purposes the fastening section is provided over its entire length with a longitudinal groove 15' which extends over the receiving section 13. The volume at the lid side is thus connected to the surroundings through a hole 11'. The diameter of the hole is 1.5 mm.

The separation sifter 4 is frictionally held in the lid via the conical connection 14, 15. In addition, it is protected from falling out of the lid during the shaking operation by being supported with its edge 16 on the inner wall 6 of the bowl 2. The conical design of that section of the separation sifter 4 that is provided with sifter holes 18 allows for a tight seat of the lid 3 even in the case of considerable manufacturing tolerances and axially protects the separation sifter 4 from slipping out of the conical connection 14, 15 as the separation sifter can more easily deform when placed on the inner wall 6. respective center lines of the sifter holes 18 extend in parallel with the vertical axis 10. The diameter of the sifter holes 18 is 1 mm.

The separation sifter 4 is also made from polypropylene and weighs about 17 g, including the fastening section 15. The wall thickness of the separation sifter is about 2 mm.

Figure 2:
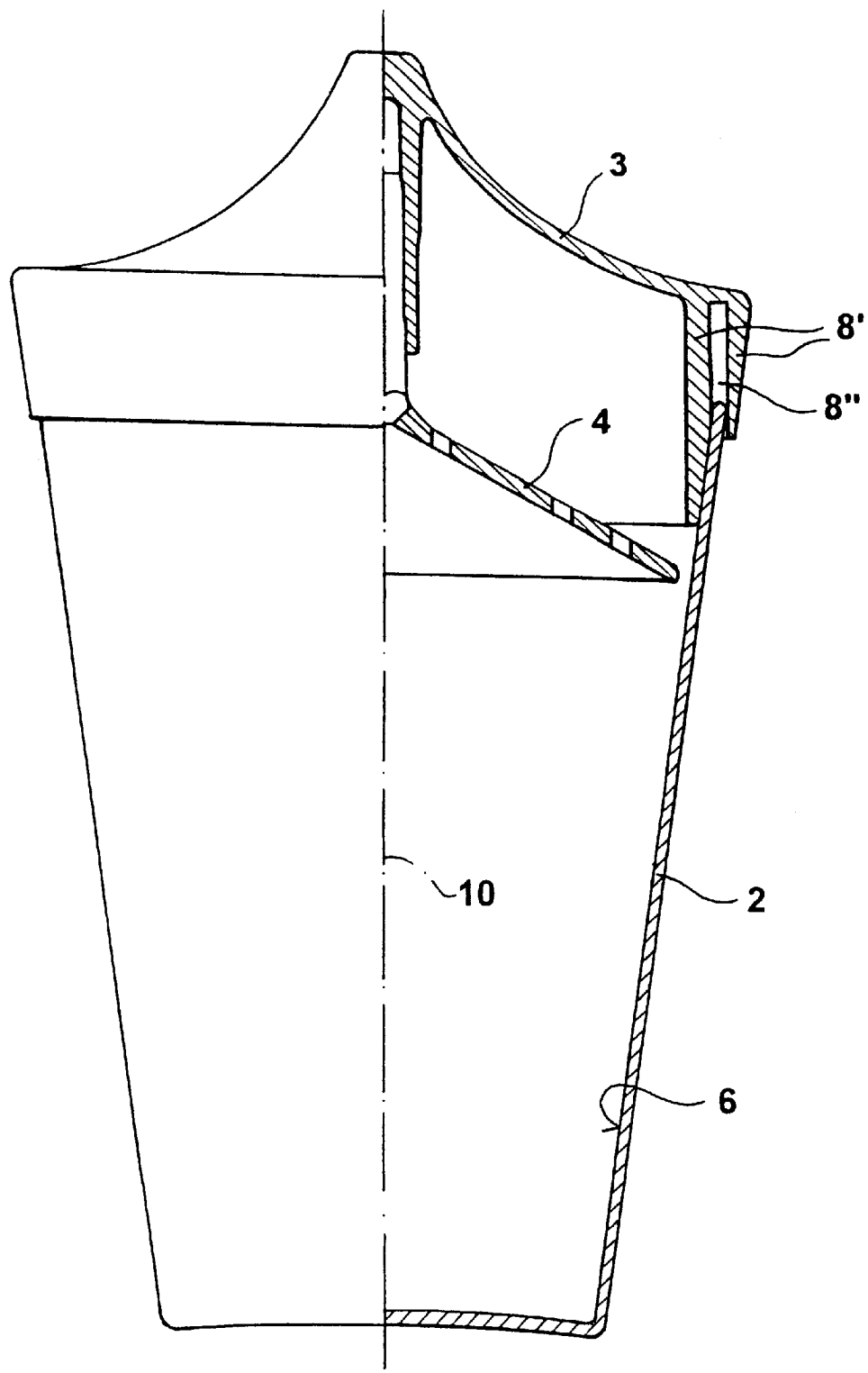
FIG. 2 is a longitudinal section showing a second embodiment of the shaker according to the invention.

The structure of the second embodiment of the shaker according to the invention shall now be explained with reference to FIG. 2 insofar as the first embodiment differs from the second embodiment. Features that are identical with those of the first embodiment are provided with identical reference numerals.

In the second embodiment the lid 3 comprises a double-walled outer wall 8' forming a recess 8". Like in the case of the first embodiment, the inner outer wall is conical, but has a smaller wall thickness. Such a configuration is easier to handle in terms of injection molding techniques because an excessive accumulation of material and thus the inclusion of bubbles in the material are avoided.

The recess 8" receives the upper bowl edge so that the edge is resiliently clamped between the two outer walls 8'. Like the outer wall of the first embodiment, the inner outer wall is supported on the inner wall of the bowl.

In contrast to the first embodiment the second embodiment has no vent hole.

Figure 3:
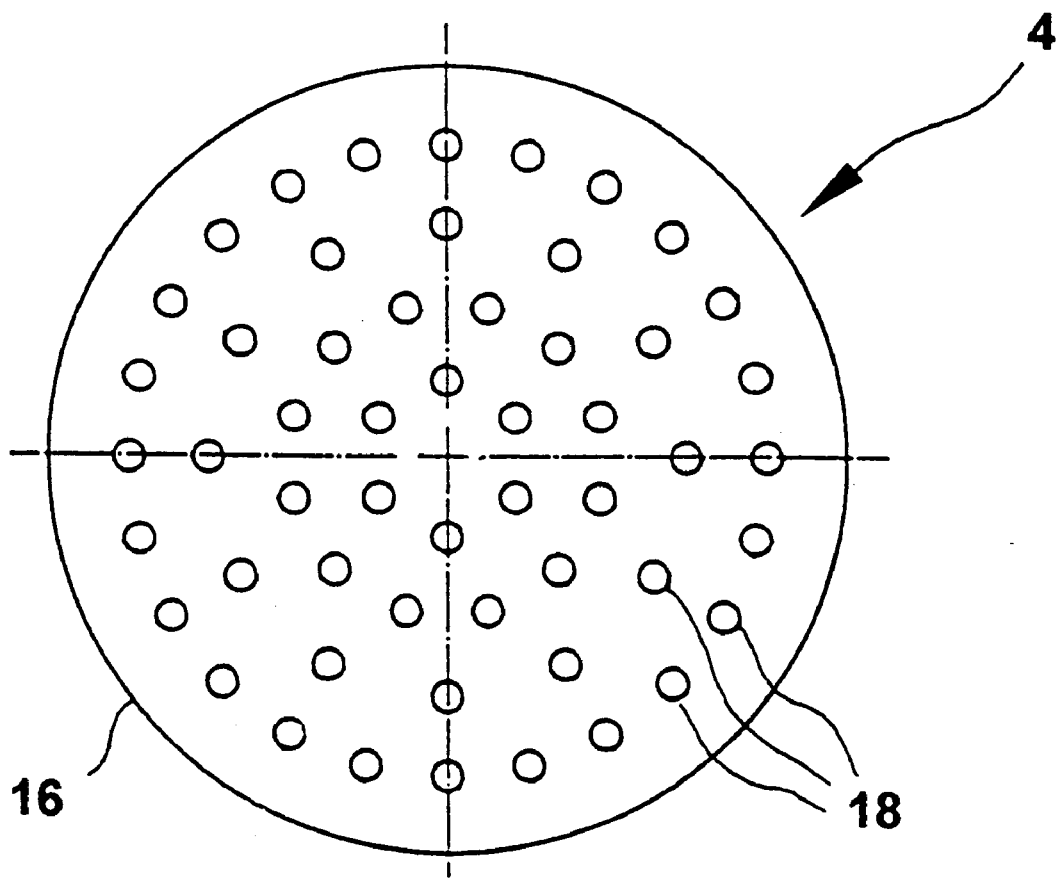
FIG. 3 shows a separation sifter of the shaker of FIG. 1, viewed from the bottom of the bowl.

FIG. 3 shows the separation sifter 4 of the embodiment of FIG. 1 as viewed from the bowl bottom 5.

The separation sifter 4 is provided with circular openings 18 which are positioned on concentric drilled circles with the vertical axis 10 as the center. A total of about 160 openings are provided for. function of the shaker according to the invention shall now be explained with reference to the first embodiment of FIG. 1. The function of the second embodiment does not differ from that of the first embodiment with respect to the foaming of liquids.

First of all, the bowl 2 is filled with milk up to half its volume at the most; the lid 3 which has inserted thereinto the separation sifter suited for milk is then put on the bowl.

When the bowl is vehemently shaken back and forth substantially i n the direction of the vertical axis, milk is pressed time and again through the holes 18 of the separation sifter 4 under the action of the accelerating forces, whereby it is whirled and gradually foamed with the air enclosed in the shaker. The parabolic design of the lid section opposite to the bottom surface 5, as an impingement surface enhances the foaming action even more in that the impinging milk is strongly deflected by reason of the curved design and is additionally whirled and sprayed with the enclosed air. Moreover, the lid is thereby given an ergonomic design and can more easily be held between index finger and middle finger during the shaking operation.

The vent hole 11' and the vent groove 15' are so small and are positioned such that no milk can escape through said members during the shaking process.

The entire amount of filled-in milk will have reached its final foamed state if it no longer sloshes about during shaking of the bowl. After the bowl has been put down, the milk foam existing in the lid area above the separation sifter will flow along the parabolic impingement surface, along the cylindrical section 9 and the inner wall 6 and over the receiving section 13, the fastening section 15 and the conical section of the separation sifter 4 through the holes 18 into the bowl 2 from where the milk foam can then be poured off. When the lid 3 is removed, milk foam residues which might still be found the lid volume can the poured off into the bowl through the gap between the lower lid edge 17 and the edge 16 of the separation sifter.

If in the hot foamed state of the milk the bowl is to stand for a long period of time and if, as a consequence of the cooling effect, the volume of the foamed milk is decreasing, air from the surroundings can subsequently flow into the interior of the shaker through the vent hole 11' and the vent groove 15'. As a consequence, no negative pressure is produced in the interior of the shaker and the lid can be removed at any time.

Thanks to the conical, planar connections between separation sifter and lid and between lid and bowl, the members can easily be taken apart after use, they are frictionally engaged even in their wetted state and can easily be cleaned.

What is claimed is:

1. A shaker for foaming dairy products, comprising:

a bowl-shaped bottom part having a vertical axis;

a lid removably mountable to the bowl-shaped bottom part for closing and sealing the bowl-shaped bottom part;

a permeable separation sifter having holes therethough and arranged substantially in a direction transverse to the vertical axis of the shaker and so that the total volume of the closed shaker is subdivided by the separation sifter in a ratio of about 2:1, wherein the separation sifter is configured to be substantially conical and wherein, in the closed state of the shaker, an outer rim of the separation sifter is closer to the bottom of the bowl-shaped bottom part than a central area of the separation sifter.

2. The shaker according to claim 1, wherein the total volume is subdivided by the separation sifter of the closed shaker such that the volume of the bowl-shaped bottom part under the sifter is about twice the volume between the sifter and the lid.

3. The shaker according to any one of claims 2 and 1, wherein the outer rim of the separation sifter in the closed state of the lid at least partially contacts an inner wall of the bowl-shaped bottom part.

4. The shaker according to claim 1, wherein the separation sifter is detachably held on the lid.

5. The shaker according to claim 4, wherein the separation sifter has a fastening section facing the lid that cooperates with a corresponding receiving section of the lid in such a manner that the separation sifter is removably held in the lid.

6. The shaker according to claim 5, wherein the fastening section and the receiving section are arranged along the vertical axis of the shaker.

7. The shaker according to claim 5, wherein the fastening section has an outer cone and the receiving section has an inner cone.

8. The shaker according to claim 5, wherein the fastening section is formed with a vent groove extending in the direction of the vertical axis.

9. The shaker according to claim 1, wherein the lid has a vent hole arranged in the area of the vertical axis and through which the volume of the bowl-shaped bottom part is connected to the atmosphere in the closed state of the bowl-shaped bottom part.

10. The shaker according to claim 1, wherein the separation sifter is frictionally connected to the lid.

11. The shaker according to claim 1, wherein the separation sifter is positively connected to the lid.

12. The shaker according to claim 1, wherein an outer wall of the lid is designed for sealing the bowl-shaped bottom part in that the outer wall of the lid substantially corresponds in shape to an inner wall of the bowl-shaped bottom part where the lid is supported on the bowl-shaped bottom part in the closed state of said bowl-shaped bottom part.

13. The shaker according to claim 1, wherein the lid comprises a double outer wall having a recess open in the direction of the bowl-shaped bottom part.

14. The shaker according to claim 13, wherein the recess is designed to receive an edge of the bowl-shaped bottom part facing the lid.

15. The shaker according to claim 1, wherein the outer rim of the separation sifter facing the bowl-shaped bottom part is spaced in the direction of the vertical axis of the shaker from a lower edge of the lid facing an inner wall of the bowl-shaped bottom part, at a distance of about 5 to 10 mm.

16. The shaker according to claim 1, wherein, in the closed state of the bowl-shaped bottom part, the lid is frictionally connected to the bowl-shaped bottom part.

17. The shaker according to claim 1, wherein, in the closed state of the bowl-shaped bottom part, the lid is positively connected to the bowl-shaped bottom part.

18. The shaker according to claim 1, wherein, in the closed state of the bowl-shaped bottom part, a section of the lid opposite to the bowl-shaped bottom part is spaced further from the bowl-shaped bottom part in the area of the vertical axis than the bottom of the lid.

19. The shaker according to claim 1, wherein an inner wall of the lid opposite to the bowl-shaped bottom part is designed as an impingement wall having a parabolic contour.

20. The shaker according to claim 1, wherein the holes through the separation sifter have a cumulative area between $0.15$ $mm^2$ and $114$ $mm^2$.

21. The shaker according to claim 1, wherein the holes through the separation sifter are circular openings each having a diameter of 0.5 mm to 6 mm and a longitudinal axis extending in the direction of the vertical axis.

22. The shaker according to claim 1, wherein the holes through the separation sifter are circumferentially extending openings, each having a width of about 0.5 mm to 4 mm in the radial direction.

23. The shaker according to claim 1, wherein the lid is made from metal.

24. The shaker according to claim 1, wherein the lid is made from a plastic material.

25. The shaker according to claim 1, wherein the bowl-shaped bottom part is made from metal.

26. The shaker according to claim 1, wherein the bowl-shaped bottom part is made from a plastic material.

27. The shaker according to claim 1, wherein the separation sifter is made from metal.

28. The shaker according to claim 1, wherein the separation sifter is made from a plastic material.

29. A method of foaming milk with a shaker according to any one of claims 2 and 1, comprising:

placing milk into the shaker; and moving the shaker back and forth in jolting fashion in the direction of the shaker axis so that the milk is pressed time and again from the volume of the bowl-shaped bottom part under the separation sifter and back through the separation sifter because of the constantly changing forces of acceleration and being thereby whirled and foamed with the air enclosed in the shaker.

* * * * *